No. 614,411. Patented Nov. 15, 1898.
W. H. ROCKWOOD.
FISHING BAIT.
(Application filed June 25, 1898.)
(No Model.)
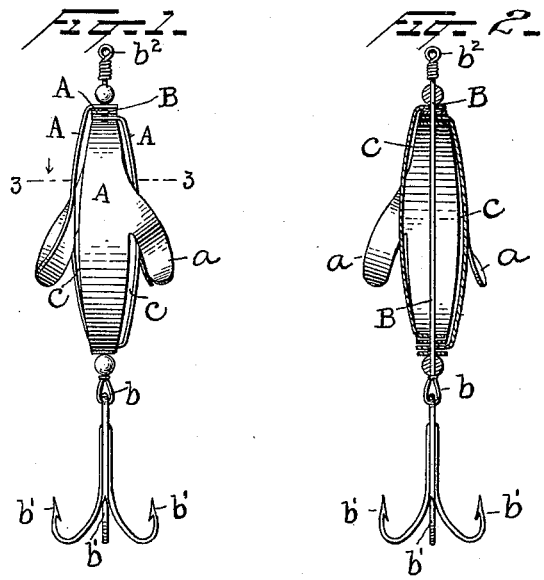
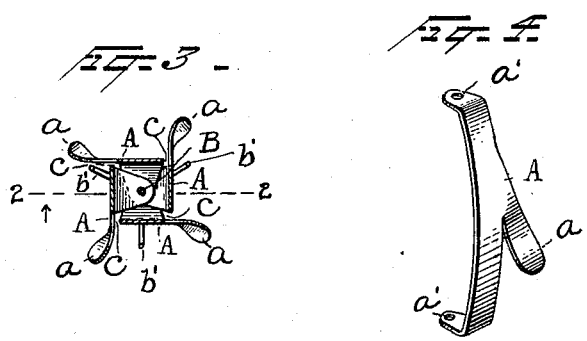
WITNESSES
Norris A. Clark.
INVENTOR
William H. Rockwood,
by Witter Kenyon,
ATT'YS

UNITED STATES PATENT OFFICE.

WILLIAM H. ROCKWOOD, OF NEW YORK, N. Y.

FISHING-BAIT.

SPECIFICATION forming part of Letters Patent No. 614,411, dated November 15, 1898.

Application filed June 25, 1898. Serial No. 684,880. (No model.)

*To all whom it may concern:*

Be it known that I, WILLIAM H. ROCKWOOD, a citizen of the United States, and a resident of the city, county, and State of New York, have invented certain new and useful Improvements in Fishing-Bait, of which the following is a specification.

My invention relates to bait to be used for trolling or similar purposes. Its object is to provide a bait for use in trolling, casting, or the like which is better able to withstand the teeth of the fish and which is accordingly more durable than bait heretofore in use, which is simple in construction, is adapted to hold a straight course when drawn through the water, and is efficient and productive of good results in use.

Heretofore the artificial bait used for trolling or similar purposes has commonly been composed of a single piece of metal or other material, or if composed of more than one piece the pieces composing it have been soldered or otherwise rigidly secured together to form a single integral structure. Such constructions of bait afford an opportunity for a firm grip of the teeth or jaws of the fish upon the bait, and, accordingly, such bait is easily damaged or destroyed. I have found that if the bait is made up of loose segments separate from or independent of each other the bait is much more durable, the teeth of fish producing very little if any injurious effect upon the bait.

My invention consists of the new and improved devices herein shown and described in the drawings accompanying the specification and forming part thereof, in which similar letters in the different figures represent corresponding parts. I have shown and will now proceed to describe the preferred form of my improved devices.

Figure 1 represents an elevation of my improved device with fish-hooks attached. Fig. 2 is a longitudinal section through the same on the lines 2 2 of Fig. 3, viewed as shown by the arrow. Fig. 3 is a transverse or cross section on the lines 3 3 of Fig. 1, viewed as shown by the arrow; and Fig. 4 is a view of a detached segment.

My improved bait is made up of separate segments A, which together form a body resembling somewhat the general form of a fish. Each of these segments is loosely mounted and is capable of revolving. As shown, each segment A is loosely mounted upon a pin or axis B. This pin forms a common axis for supporting the segments and is hooked at one end at $b$, for connection with ordinary fish-hooks $b'$, and is hooked at the other end, as at $b^2$, for connection with a fish-line. Each segment is preferably provided with a curved blade $a$ to impart to the bait a revolving motion as it is drawn through the water. The means shown for connecting the segments to pin B are the holes $a'$. (Shown at each end of the segment in Fig. 4.)

As shown in the drawings, the bait is composed of four segments, although the number of segments may be increased or diminished, as desired. The segments are separate from and independent of each other, each being loosely mounted upon the common axis—pin B—the segments together forming a body surrounding and capable of revolving upon the said common axis. By reason of this construction the teeth or jaws of fishes cannot obtain a firm bite or grip upon the bait. The bait is thus much more durable than any bait now in use of which I am aware.

Between the edges of adjoining segments is an opening $c$, through which water can pass as the bait is drawn through the water.

My improved bait is light in weight, simple in construction, holds a straight course when drawn through the water, is less likely to cause the hooks to catch in weeds or other extraneous substances, and is more durable, as above described.

The number of segments can be varied at will, although I find that a bait made up of four segments, as shown, gives good results. The manner of mounting these segments may be varied from that shown, although I prefer to mount them upon a common pin or axis, as shown in Fig. 2. Similarly the space between the edges of adjoining segments can be increased or diminished, as desired.

What I claim as new, and desire to secure by Letters Patent, is—

1. A bait for trolling, or similar purposes, composed of segments, each loosely mounted upon a common axis and capable of revolving thereon, and each segment separate from and independent of each other segment, the segments together forming a body surrounding and capable of revolving upon the common axis, substantially as set forth.

2. A bait for trolling, or similar purposes, composed of segments, each loosely mounted upon a common axis and capable of revolving thereon, and each separate from and independent of each other segment, and curved blades upon said segments for revolving the same when the bait is drawn through the water, substantially as set forth.

In testimony whereof I have signed my name to this specification in the presence of two subscribing witnesses.

WILLIAM H. ROCKWOOD.

Witnesses:
  EDWIN SEGER,
  JOHN O. GEMPLER.